United States Patent
Kageyama

(10) Patent No.: US 10,048,677 B2
(45) Date of Patent: Aug. 14, 2018

(54) NUMERICAL CONTROLLER THAT SHORTENS CYCLE TIME OF MACHINING PROGRAM

(71) Applicant: FANUC Corporation, Minamitsuru-gun, Yamanashi (JP)

(72) Inventor: Yuuichi Kageyama, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 148 days.

(21) Appl. No.: 14/821,988

(22) Filed: Aug. 10, 2015

(65) Prior Publication Data

US 2016/0054727 A1    Feb. 25, 2016

(30) Foreign Application Priority Data

Aug. 22, 2014 (JP) ................. 2014-169806
Jul. 13, 2015 (JP) ................. 2015-139671

(51) Int. Cl.
*G05B 19/4103* (2006.01)
*G05B 19/404* (2006.01)

(52) U.S. Cl.
CPC ........ *G05B 19/4103* (2013.01); *G05B 19/404* (2013.01); *G05B 2219/31278* (2013.01); *G05B 2219/34325* (2013.01)

(58) Field of Classification Search
CPC .......... G05B 2219/36056; G05B 2219/43041; G05B 2219/49108; G05B 2219/34325; G05B 2219/31278; G05B 19/18–19/4166
USPC ................................. 700/159–195
See application file for complete search history.

(56) References Cited

U.S. PATENT DOCUMENTS

| | | | | |
|---|---|---|---|---|
| 6,007,280 A | * | 12/1999 | Asahi ................. | G05B 19/4099 409/132 |
| 2013/0317641 A1 | * | 11/2013 | Terada ................. | G05B 19/182 700/186 |
| 2015/0331409 A1 | | 11/2015 | Oka | |

FOREIGN PATENT DOCUMENTS

| | | |
|---|---|---|
| DE | 10343785 A1 | 4/2005 |
| DE | 10346589 A1 | 5/2005 |
| DE | 102007045620 A1 | 4/2009 |
| JP | S62-154114 A | 7/1987 |
| JP | H07-28519 A | 1/1995 |
| JP | H07-182021 A | 7/1995 |

(Continued)

OTHER PUBLICATIONS

Decision to Grant a Patent dated Dec. 20, 2016 in Japanese Patent Application No. 2015-139671 (3 pages) with English translation (3 pages).

(Continued)

*Primary Examiner* — Robert Fennema
*Assistant Examiner* — Shon Foley
(74) *Attorney, Agent, or Firm* — Drinker Biddle & Reath LLP

(57) ABSTRACT

A numerical controller decodes a block read out from a machining program, calculates execution data to be used for control over a machine tool, and determines whether a travel amount resulting from travel instructions for control axes of the machine tool is existent or not based on the calculated execution data. If the travel amount resulting from the travel instructions for the control axes is not existent as a result of such determination, processes for the present block are omitted and cycle time is thereby shortened.

2 Claims, 5 Drawing Sheets

\* BLOCKS THAT PROVIDE INSTRUCTIONS FOR OPERATION OF MACHINE TOOL BUT RESULT IN "ZERO" TRAVEL AMOUNT AS A CONSEQUENCE OF VECTOR OPERATION OR THE LIKE. THE BLOCKS ARE WASTEFUL BLOCKS THAT ONLY CONSUME TIME.

(56) References Cited

FOREIGN PATENT DOCUMENTS

| | | |
|---|---|---|
| JP | H11-345016 A | 12/1999 |
| JP | 2015-219599 A | 12/2015 |

OTHER PUBLICATIONS

Office Action dated Oct. 30, 2017 in German Patent Application No. 10 2015 010 654.6 (7 pages) with an English translation (7 pages).

\* cited by examiner

* BLOCKS THAT PROVIDE INSTRUCTIONS FOR OPERATION OF MACHINE TOOL BUT RESULT IN "ZERO" TRAVEL AMOUNT AS A CONSEQUENCE OF VECTOR OPERATION OR THE LIKE. THE BLOCKS ARE WASTEFUL BLOCKS THAT ONLY CONSUME TIME.

NUMERICAL CONTROLLER THAT SHORTENS CYCLE TIME OF MACHINING PROGRAM

RELATED APPLICATION DATA

This application claims priority under 35 U.S.C. § 119 and/or § 365 to Japanese Application No. 2014-169806 filed Aug. 22, 2014 and Japanese Application No. 2015-139671 filed Jul. 13, 2015, the entire contents are incorporated herein by reference.

BACKGROUND OF THE INVENTION

1. Field of the Invention

The present invention relates to a numerical controller that shortens cycle time of a machining program.

2. Description of the Related Art

A numerical controller controls a machine tool by reading out blocks in a machining program, stored in a memory such as SRAM, one by one and operating servomotors and spindles based on instructions of the blocks that have been read out. Among the blocks that compose the machining program, there are instructions that directly control the machine tool, user macro instructions that do not directly control the machine tool, and blocks that are composed of only comments.

When reading out a block including user macro instruction or only comments, not directly relating to operations of the machine tool, the numerical controller analyzes the block, and proceeds to next block immediately after completion of calculation, thereby enabling the numerical controller to exercise control so that processes are carried out without waste. In a prior art technique as disclosed in, for example, Japanese Patent Application Laid-Open No. 62-154114, in case where there are a plurality of successive blocks not directly relating to operations of a machine tool, such as user macro instructions and comments, in a machining program, the plurality of successive blocks are deemed as one block so that they are subjected to collective processing.

In a machining program, there may be blocks that provide instructions for axis travel and that result in zero travel amount as a consequence of calculation on tool correction vectors or the like. For instance, blocks "ZERO TRAVEL <1>", "ZERO TRAVEL <2>", and the like in FIG. 6 are wasteful blocks that result in no actual travel of axes and that only consume time though the blocks directly relate to operations of a machine tool. In case where a lot of blocks that lead to no travel instructions for the axes and that only consume time exist in the machining program, cycle time of the machining program is retarded all the more.

In a technique disclosed in Japanese Patent Application Laid-Open No. 62-154114 described above, however, in case where there are a plurality of successive blocks not directly relating to controls of a machine tool, such as user macro instructions and comments, the plurality of successive blocks are deemed as one block in order to make short the cycle time of the machining program. But, as for instructions directly relating to control over a machine tool, conventional processes are carried out without alteration. For this reason, instruction blocks that operate a machine tool having no axis travel amount as a result of such calculation as described above are not regarded as a cycle time shortening object, so there is a problem that time is wasted for processing of such blocks.

SUMMARY OF THE INVENTION

An object of the present invention is to provide a numerical controller that is capable of shortening cycle time of a machining program by eliminating processing time for useless blocks in the machining program.

The numerical controller according to the present invention controls a machine tool including control axes based on a machining program and includes an execution data calculation unit that decodes a block read out from the machining program and that calculates execution data to be used for control over the machine tool and a travel amount determination unit that determines whether a travel amount resulting from travel instructions for the control axes of the machine tool is existent or not, based on the execution data calculated by the execution data calculation unit. If it is determined that the travel amount resulting from the travel instructions for the control axes of the machine tool is not existent, processes for the block are omitted.

The travel amount determination unit may be configured so as to cause a shift to processes for a block next to the block of the machining program if it is determined that the travel amount resulting from the travel instructions for the control axes of the machine tool is not existent.

According to the present invention, by proceeding to the next block without execution of the block that results in zero travel amount as a result of analysis of the machining program and calculation of the travel amount, blocks to be necessarily executed are extracted, processing time for useless blocks is eliminated, and cycle time of the machining program is shortened. Improvement in productivity is expected because the cycle time of the machining program is shortened.

BRIEF DESCRIPTION OF THE DRAWINGS

The above-mentioned and other objects and features of this invention will become apparent from the following description of an embodiment with reference to the accompanying drawings, in which.

DETAILED DESCRIPTION OF THE PREFERRED EMBODIMENTS

Figure 1:
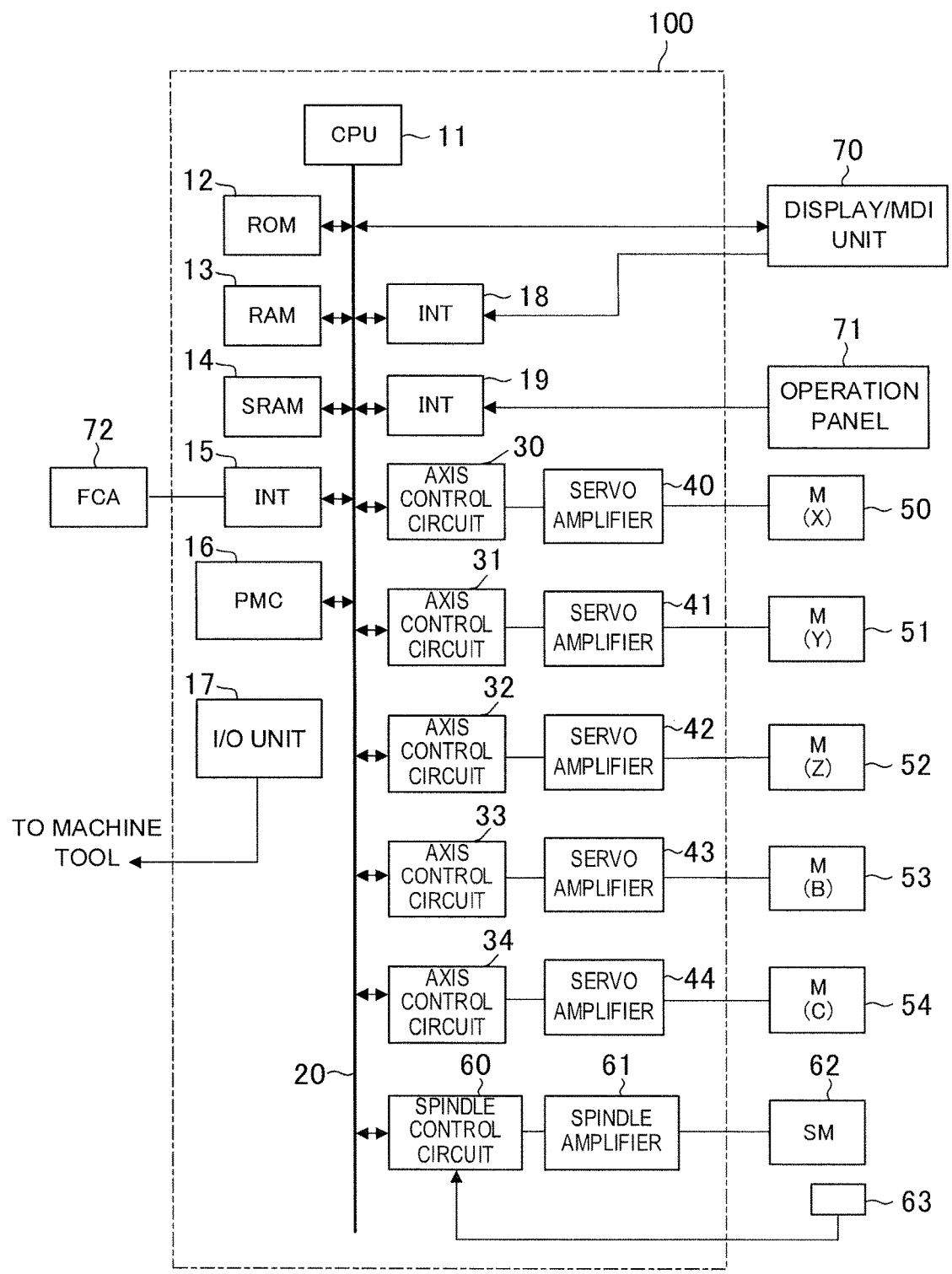
FIG. 1 is a schematic block diagram that illustrates a numerical controller according to the embodiment of the invention.

An embodiment of a numerical controller according to the invention will be described with reference to FIG. 1.

A CPU 11, which is a processor that generally controls the numerical controller 100, reads out system programs stored
} in a ROM 12 via a bus 20 and controls the whole numerical controller 100 in accordance with the system programs. Temporary calculation data and display data, and various types of data inputted by an operator through a display/MDI unit 70 are stored in a RAM 13.

An SRAM 14 is configured as a nonvolatile memory which is backed up by a battery (not illustrated) and in which a storage state is held when the numerical controller 100 is powered off. Machining programs read in through an interface 15, machining programs inputted through the display/MDI unit 70, and the like are stored in the SRAM 14. System programs for carrying out processes in an edit mode required for preparation and editing of machining programs, processes for automatic operation, and the like have been written in advance into the ROM 12.

Various types of machining programs including machining programs for implementing the invention can be inputted through the interface 15, the display/MDI unit 70, or the like and can be stored in the SRAM 14.

The interface 15 makes it possible to provide connection between the numerical controller 100 and an external device 72 such as an adapter. From a side of the external device 72, the machining programs, various parameters, and the like are read in. The machining programs edited in the numerical controller 100 can be stored in an external storage means through the external device 72. A PMC (programmable machine controller) 16 outputs signals to and exercises control over auxiliary devices (actuators such as robot hand for replacement of tools, for instance) for the machine tool through an I/O unit 17 in pursuance of sequence programs stored in the numerical controller 100. Besides, the PMC 16 receives signals from switches in an operation panel provided on a main unit of the machine tool and/or the like, carries out necessary processes for the signals, and thereafter transfers the signals to the CPU 11.

The display/MDI unit 70 is a manual data input device including a display, a key board, and the like. An interface 18 receives instructions, data, and the like from the keyboard of the display/MDI unit 70 and transfers the instructions, the data, and the like to the CPU 11. An interface 19 is connected to the operation panel 71 that includes a manual pulse generator and the like.

Axis control circuits 30 through 34 for axes receive travel amount instructions for the axes from the CPU 11 and output instructions for the axes to servo amplifiers 40 through 44. The servo amplifiers 40 through 44 receive the instructions and drive servomotors 50 through 54 for the axes. The servomotors 50 through 54 for the axes house position/speed detectors, feed back position/speed feedback signals from the position/speed detectors to the axis control circuits 30 through 34, and carry out feedback control of positions/speeds. In the block diagram, illustration of feedback of the positions/speeds is omitted.

A spindle control circuit 60 receives spindle rotation instructions for the machine tool and outputs spindle speed signals to a spindle amplifier 61. The spindle amplifier 61 receives the spindle speed signals, rotates a spindle motor 62 of the machine tool at a rotation speed based on the instructions, and drives tools.

A position coder 63 is coupled to the spindle motor 62 by gears, a belt, or the like and outputs feed-back pulses in synchronization with rotation of the spindle. The feed-back pulses pass through the bus 20 and are read by the processor 11.

Figure 2:
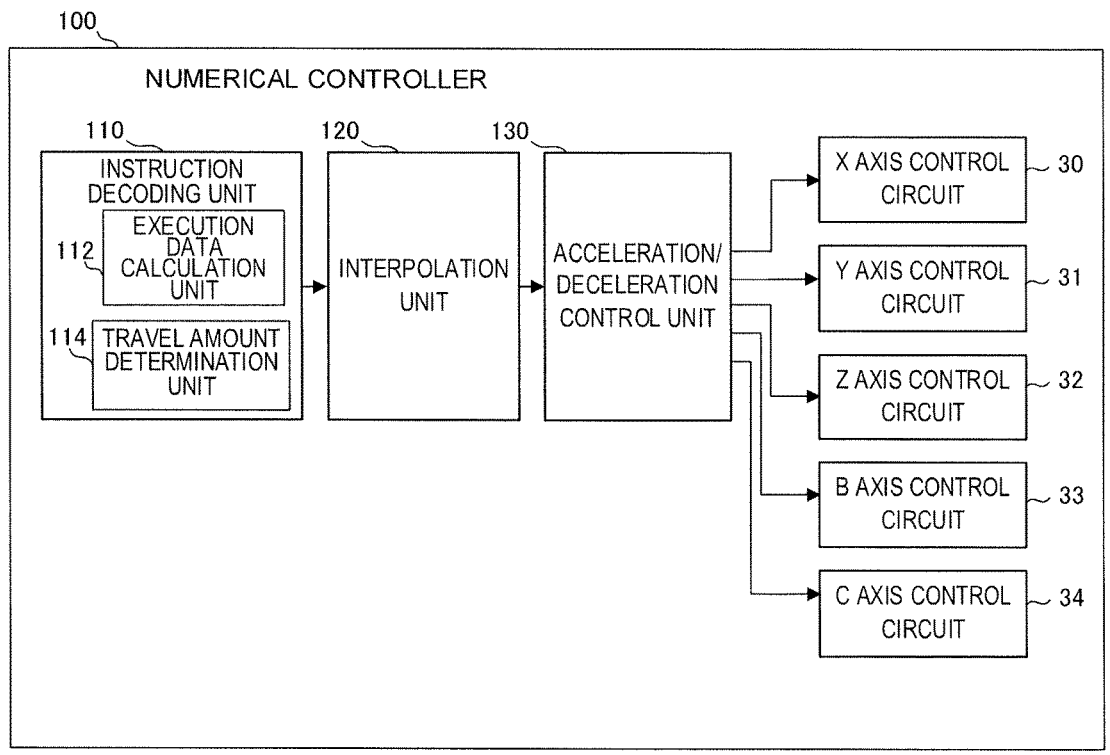
FIG. 2 is a functional block diagram that illustrates the numerical controller of FIG. 1.

FIG. 2 is a functional block diagram that illustrates the numerical controller 100 illustrated in FIG. 1.

The numerical controller 100 includes an instruction decoding unit 110, an interpolation unit 120, and an acceleration/deceleration control unit 130.

Figure 3:
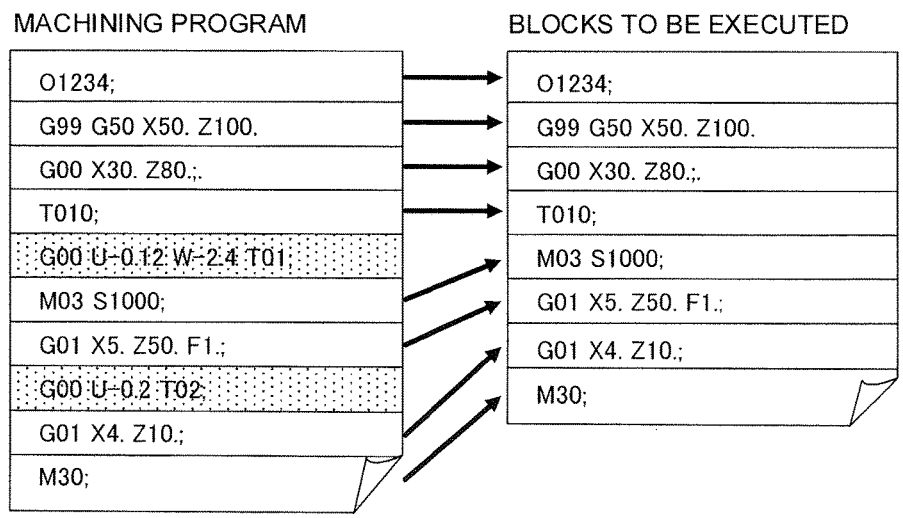
FIG. 3 is a diagram that illustrates an outline of a process of eliminating useless blocks in machining blocks by the numerical controller of the invention.

The instruction decoding unit 110 decodes program instructions of the machining program that are read from the SRAM 14 or the like and calculates execution data to be used by the interpolation unit 120 and the acceleration/deceleration control unit 130. The instruction decoding unit 110 carries out calculation and the like of the tool correction vectors or the like, when calculating the execution data, determines whether the travel amount resulting from the travel instructions for the control axes of the machine tool is to be actually existent or not based on the execution data, and omits processes on useless blocks that result in zero travel amount as illustrated in FIG. 3.

The interpolation unit 120 generates data resulting from interpolation calculation of points on an instruction path at an interpolation cycle based on the data outputted by the instruction decoding unit 110 and controls servo axes based on the data and data outputted from the acceleration/deceleration control unit 130.

The acceleration/deceleration control unit 130 carries out an acceleration/deceleration control process based on the data outputted by the instruction decoding unit 110 and the interpolation data outputted by the interpolation unit 120, calculates speeds for the drive axes for each interpolation cycle, and issues instructions on the speeds to the drive axes. The speeds for the drive axes that are to be controlled are calculated based on setting values of instruction speeds that are included in the data analyzed by the instruction decoding unit 110, positions of the axes in each interpolation cycle that are included in the interpolation data outputted by the interpolation unit 120, acceleration/deceleration time constants, and the like.

Hereinbelow, flow of the processes that are executed on the numerical controller 100 and that have been described above will be described in comparison with processes in the prior art.

Initially, flow of instruction decoding processes for one block in execution of a machining program by a conventional numerical controller will be described with use of a flow chart of FIG. 4.

[Step SA01] One block is read out from the machining program.

[Step SA02] An instruction of the block read out is decoded.

[Step SA03] As a result of decoding of the instruction of the block, it is determined whether the instruction of the block is an instruction that controls a machine tool or not. The flow proceeds to step SA04 if the instruction is the instruction that controls the machine tool, whereas the flow returns to step SA01 if the instruction is not the instruction that controls the machine tool (that is, if the instruction is a user macro instruction, a comment, or the like).

[Step SA04] Execution data for axis travel instructions, auxiliary function instructions, and/or the like is calculated from the instructions decoded in step SA02.

[Step SA05] Control over the machine tool is carried out based on the execution data calculated in step SA04.

Figure 4:
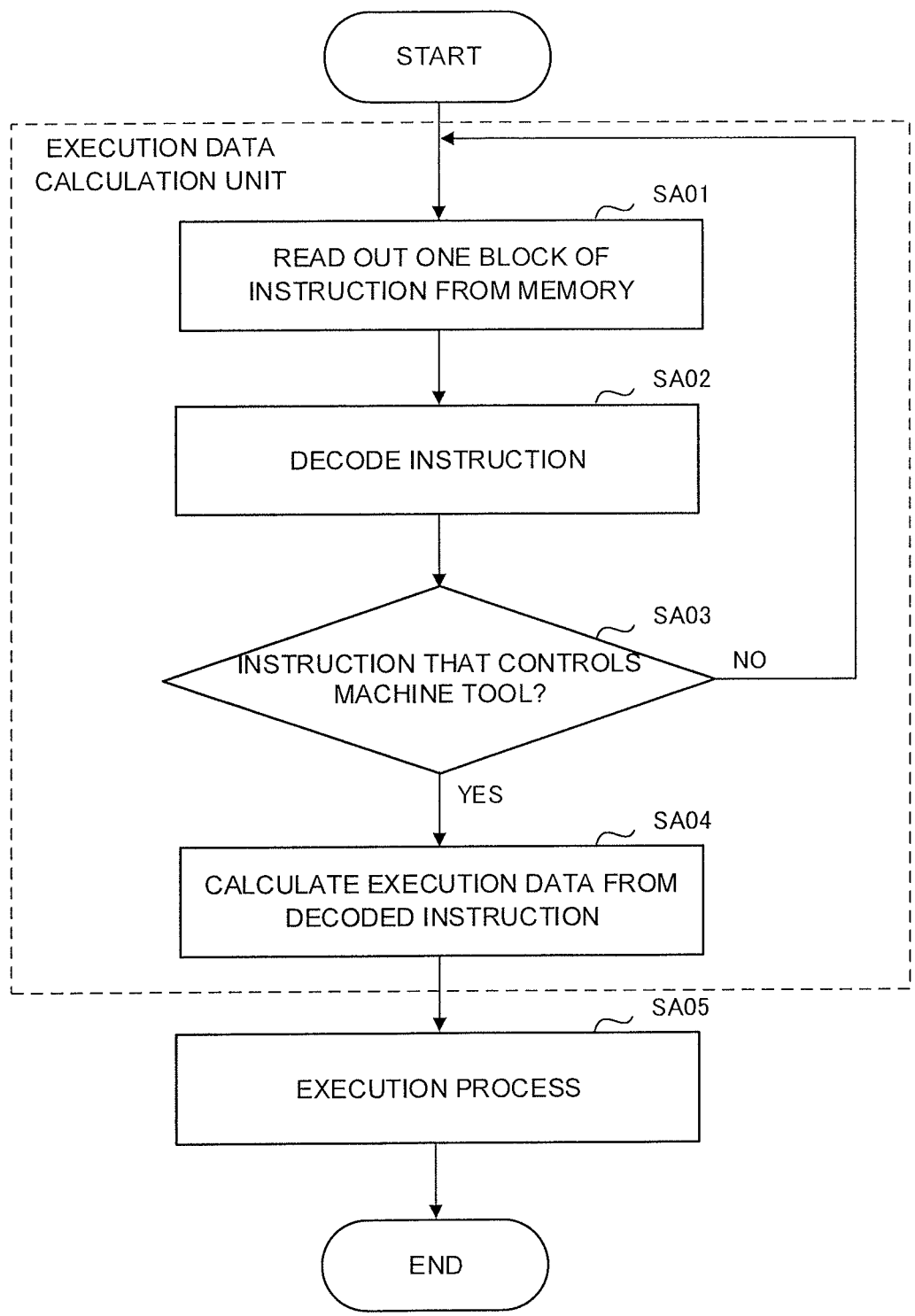
FIG. 4 is a flow chart that illustrates an instruction decoding process which is executed by a conventional numerical controller.

In the flow chart of FIG. 4, processes from step SA01 to step SA04 that have been mentioned above are processes the instruction decoding unit 110 executes as an execution data calculation unit 112.

Subsequently, flow of the instruction decoding processes for one block in the execution of the machining program by the embodiment of the numerical controller 100 of the invention will be described with use of a flow chart of FIG. 5.

[Step SB01] One block is read out from the machining program.

[Step SB02] An instruction of the block read out is decoded.

[Step SB03] As a result of decoding of the instruction of the block, it is determined whether the instruction of the block is an instruction that controls the machine tool or not. The flow proceeds to step SB04, if the instruction is the instruction that controls the machine tool, or the flow returns to step SB01, if the instruction is not the instruction that controls the machine tool (if the instruction is a user macro instruction, a comment, or the like).

[Step SB04] Execution data for axis travel instructions, auxiliary function instructions, and/or the like is calculated from the instruction decoded in step SB02.

[Step SB05] It is determined, based on the execution data calculated in step SB04, whether the travel amount resulting from the travel instructions for the control axes of the machine tool is to be actually existent or not for the block read out. The flow proceeds to step SB06 if the travel instructions for the control axes are to be actually existent, whereas the flow returns to step SB01 if the travel instructions for the control axes are not to be actually existent. The flow proceeds to step SB06 if the block read out is an auxiliary function instruction.

[Step SB06] The control over the machine tool is carried out based on the execution data calculated in step SB04.

Figure 5:
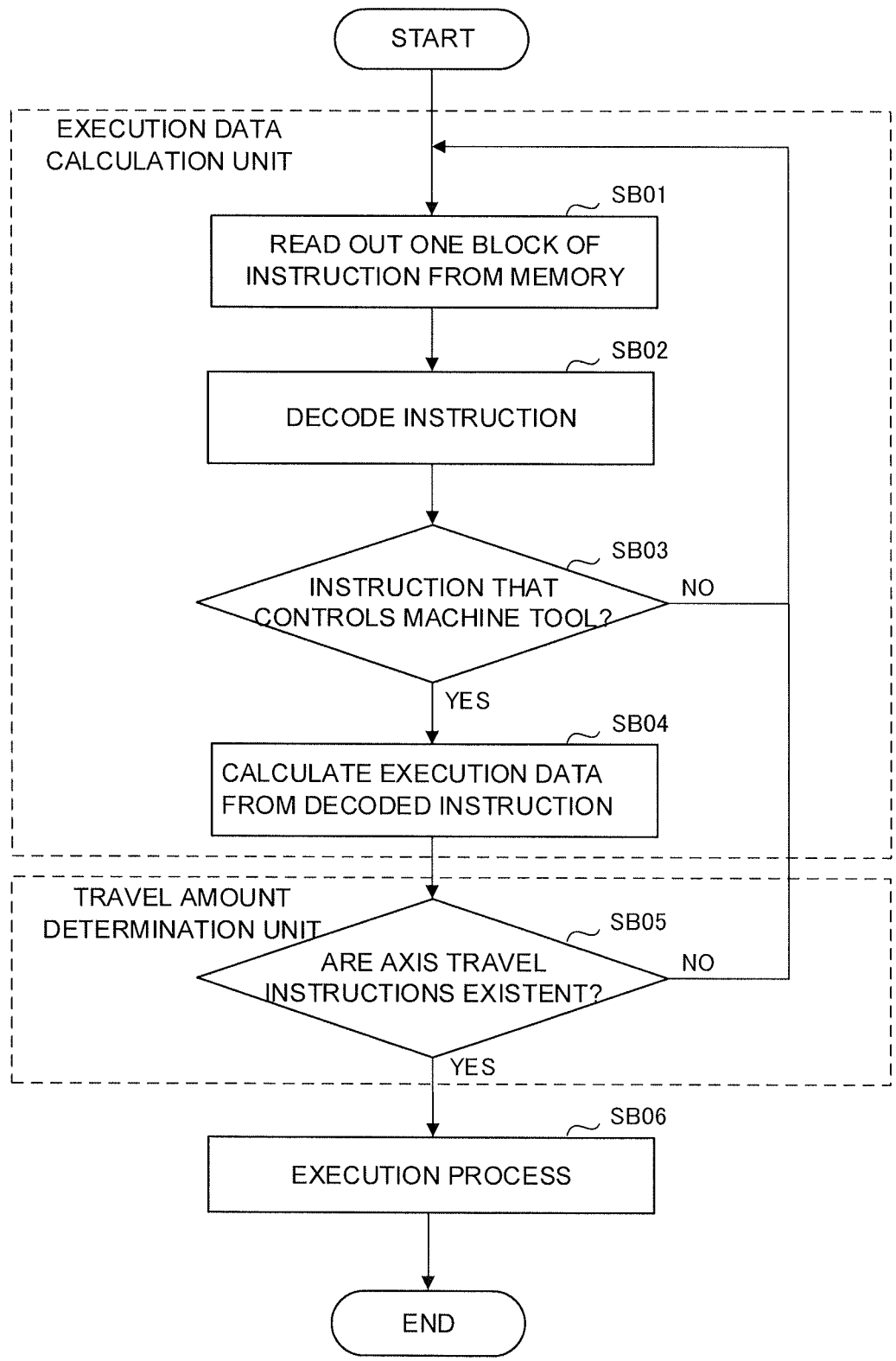
FIG. 5 is a flow chart that illustrates an instruction decoding process which is executed by the numerical controller of the invention.
Figure 6:
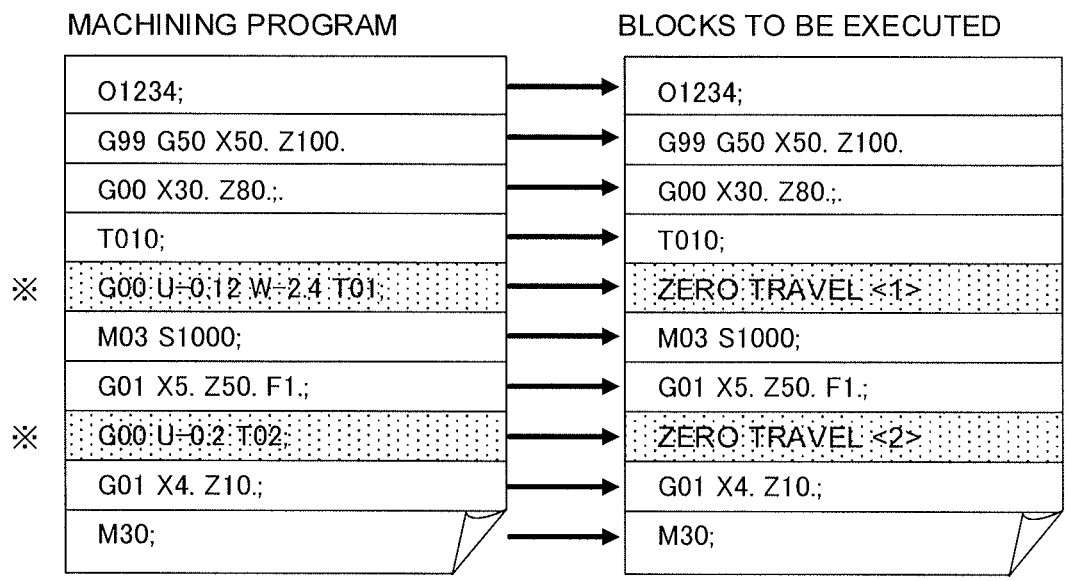
FIG. 6 is a diagram that illustrates problems with a conventional numerical controller.

In the flow chart of FIG. 5, processes from step SB01 to step SB04 that have been mentioned above are processes the instruction decoding unit 110 executes as the execution data calculation unit 112. A process of step SB05 that has been mentioned above is a process the instruction decoding unit 110 executes as a travel amount determination unit 114.

Specific examples of operation (first and second examples of operation) in which the machining program is executed on the numerical controller 100 with configurations described above will be elucidated below.

First Example of Operation

On condition that a correction has been made by a tool offset of 0.523 [mm] for X axis in a chosen tool T0101, an instruction "G01 X-0.523" given by the machining program causes addition of the tool offset of 0.523 [mm] to an end point position (X-0.523). Consequently, incremental travel amount has a value of "0.000" and a shift to processes for the next block is made without execution of "G01 X-0.523" of the machining program.

As a consequence of calculation of the travel amount of a tool with the tool offset added to the end point position in each block of the machining program, the travel amount is "0.000", resulting in a block which does not cause the axis to travel and consumes time of the interpolation cycle. The travel amount determination unit 114, being sub-functional means of the instruction decoding unit 110 included in the numerical controller 100 according to the invention, eliminates such a block which does not cause the axis to travel and consumes time of the interpolation cycle.

Second Example of Operation

When an instruction "G91 G01 X[#100-#501-#1]" of the machining program is to be executed with settings of macro variables of #100=123.987, #500=0.987, and #1=123.000, the instruction of the machining program to which values of the macro variables have been assigned is "G91 G01 X[123.987-0.987-123.000]" and the travel amount for X axis is "0.000" as a result of calculation with use of the values of the macro variables. Therefore, a shift to the processes for the next block is made without execution of the instruction "G91 G01 X[#100-#501-#1]" of the machining program.

As a consequence of calculation of a macro of the machining program, the incremental travel amount is "0.000", resulting in a block which does not cause the axis to travel and consumes time of the interpolation cycle. The travel amount determination unit 114, being sub-functional means of the instruction decoding unit 110 included in the numerical controller 100 according to the invention, eliminates such a block that does not have to be executed but consumes the time of interpolation cycle.

The invention claimed is:

1. A numerical controller that controls a machine tool including control axes based on a machining program, the numerical controller comprising a processor configured to:
    decode a block read out from the machining program;
    calculate execution data to be used for control over the machine tool; and
    control the machine tool based on the calculated execution data,
    wherein
    if, based on the calculated execution data, a travel amount resulting from travel instructions for the control axes of the machine tool is determined to result in zero movement of the control axes, the processor is configured to modify the execution data by omitting the block read out from the machining program,
    the travel instructions for the control axes of the machine tool determined to result in zero movement of the control axes consisting of at least one of a tool correction vector and a setting value for a macro variable.

2. The numerical controller according to claim 1, wherein if it is determined that the travel amount resulting from the travel instructions for the control axes of the machine tool would result in zero movement, the processor is configured to modify the execution data by replacing the block read out from the machining program with a next block following the block read out from the machining program.

* * * * *